May 5, 1931. D. J. BERGMAN 1,803,956
PROCESS AND APPARATUS FOR VAPOR FRACTIONATION
Filed April 22, 1927

Inventor:
Donald J. Bergman,
By Frank L. Belknap
Atty.

Witness:
Stephen W. Wilson

Patented May 5, 1931

1,803,956

UNITED STATES PATENT OFFICE

DONALD J. BERGMAN, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR VAPOR FRACTIONATION

Application filed April 22, 1927. Serial No. 185,689.

This invention relates to improvements in a method of and apparatus for vapor fractionation, and refers more particularly to improvements in the art of dephlegmating or fractionating hydrocarbon oil vapors, more specifically those produced in the conversion of hydrocarbon oils under heat and pressure, whereby insufficiently cracked fractions are condensed as reflux condensate and subjected to further treatment, while the sufficiently cracked fractions are removed, condensed and collected, as a marketable product.

In the specific embodiment of the present invention, the reflux condensate is separated at various stages in the fractionating tower and falls in the form of jets, entraining and thoroughly mixing with the vapors. Between each stage or zone in the fractionating tower, where the mixture of vapors and reflux takes place, there is provided a zone where the vapors are permitted to separate and from which the reflux condensate is falling in the form of jets. These vapors ascend to a zone above the first mentioned zone where they are again subjected to the same action, which action is repeated throughout the height of the tower in a number of different zones.

An object of the present invention is to obtain intimate contact between the vapor and cooling liquid which is accomplished in the present invention by the use of the entraining jets of liquid. Subsequent to each stage where this intimate contact, due to the use of entraining jets, takes place, the mixture passes to what might be termed a quiescent zone in which the vapors separate.

Another object of the present invention is to cause to be maintained in the different zones throughout the fractionating tower pools of reflux condensate, thus permitting the reflux to be maintained for a maximum time in a given zone.

A still further object of the invention is to cause the reflux descending through the jet eductors to be withdrawn from the bottom of each pool, which insures the removal of dirt or other solid foreign particles which tend to settle to the bottom of each pool, while on the other hand permitting the bodies collecting in the upper part of each pool to be subjected to conditions which will cause the lighter fractions to separate as vapors.

As a feature of the invention, since a varying quantity of liquid would change the height of the liquid pool maintained in each zone, I have provided for decreasing or increasing the area of the apertures through which the liquid falls, to adjust for different tower capacities.

As a further feature of the invention, in order to increase the volume of reflux falling to any given deck and approach more nearly to the equilibrium between vapor and liquid, I have provided for pumping back cooling liquid and reflux from one deck up to a previous one to accomplish this purpose.

I have attached hereto a drawing for the purpose of more clearly illustrating the invention, but it is to be understood that many changes may be made within the skill of those versed in this art, both in the method and in the apparatus shown without departing from the fundamental concept of the invention.

In the drawings, Fig. 1 is a vertical sectional view, with parts broken away, of a fractionating tower equipped to carry out the objects of the invention.

Figure 1:
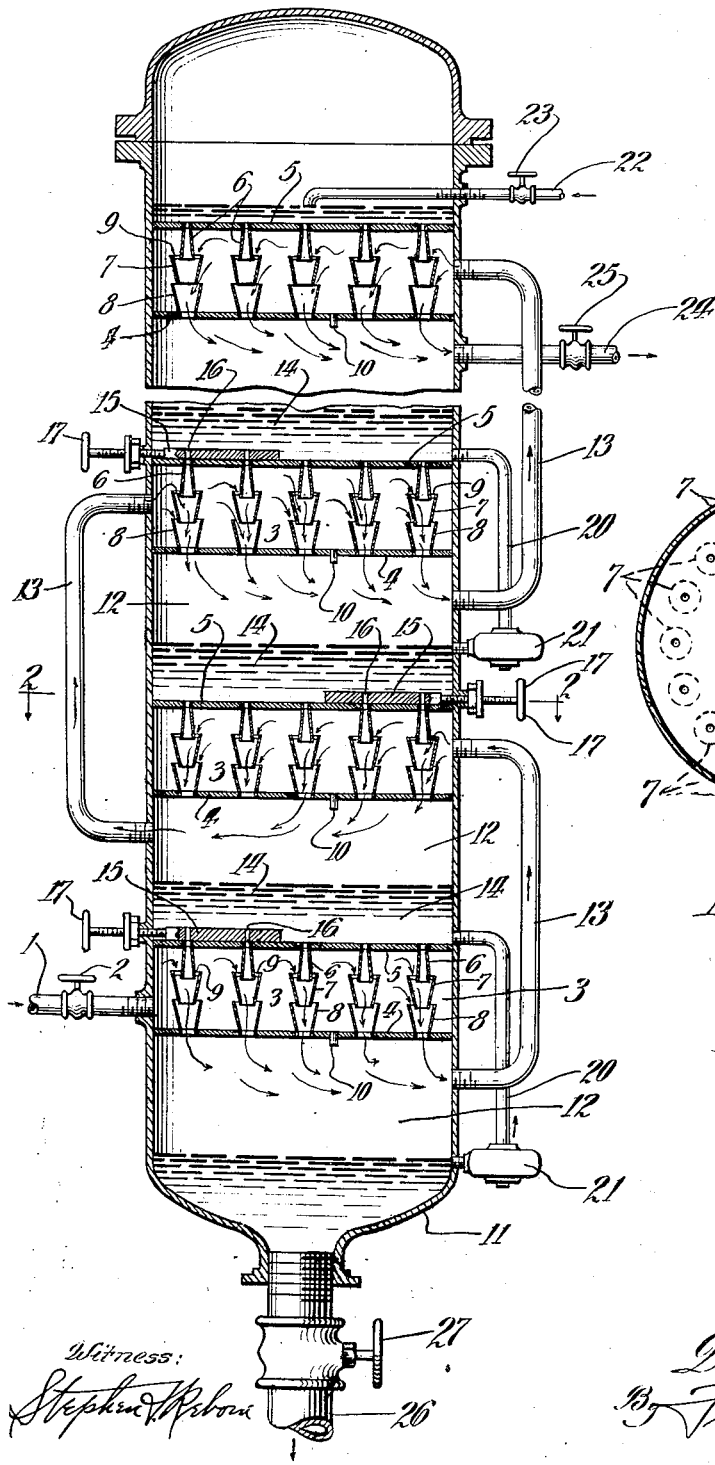
Figure 2:
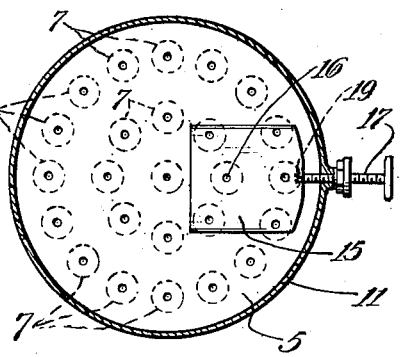
Fig. 2 is a cross-sectional view taken on line 2—2 of Fig. 1.
Figure 3:
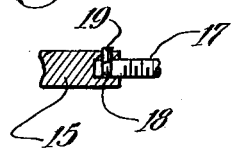
Fig. 3 is an enlarged fragmentary cross-sectional view, illustrating the connection between the orifice valve and means for manipulating it.

Referring more in detail to the drawings, 1 designates an inlet pipe in which may be interposed valve 2 through which heated vapors, for instance, from a concurrently operating hydrocarbon oil cracking plant, may pass, being introduced into the chamber 3. This chamber 3 is formed by spacing plates 4 and 5 a suitable distance from each other. It is particularly to be noted that these plates are preferably imperforate except for the openings into the jet eductors which will now be described. Depending from each plate 5 are a plurality of spaced, downwardly projecting jet eductors or conduits 6. These conduits are preferably smaller at the top than at the bottom, each of which discharges into a second conduit 7 which is preferably larger at its top and smaller at its bottom, as indicated. The lower end of this second conduit 7 is disposed below the upper edge of a third conduit 8 which may be similar in design and shape to the conduit 7, having a greater diameter at its top than at its bottom. The conduits 6 and 7 may be connected by means of the supporting elements 9, while the conduits 8 may project upwardly from the plate 4. Each plate 4 may also be provided with the drain pipe 10. There are a number of chambers 3 separated by plates 4 and 5, spaced and disposed throughout the height of the tower 11. The alternate spaces between each set of plates 4 and 5 comprise chambers which may be designated 12. A vapor riser 13 communicates between a chamber 12 and the second chamber 3 spaced thereabove.

The operation of the device may be described as follows:

Vapors entering through pipe 1 pass into the chamber 3 and, due to the velocity of the descending reflux jetting through the conduits 6, 7 and 8, will become entrained therewith as indicated by the arrows, and the mixture carried downwardly to the chamber 12 therebelow. In the chamber 12 the liquid and vapors will have an opportunity to separate, the vapors passing upwardly through the riser 13 into a similar chamber 3 spaced above the one just described. The same action takes place in this second chamber 3, which action is repeated throughout the height of the tower. For the purpose of more specific identification, it may be well to refer to the chambers 3 as the jet chambers, and the chambers 12 as the separating chambers.

The number and size of the orifices or apertures in each plate 5 are computed so as to retain on each of the plates a liquid level of cooling liquid and reflux, such as illustrated at 14.

From the foregoing, it will be apparent that by the present invention there is secured a very intimate contact between the vapors and liquid, while at the same time in each of the separating zones the reflux is subjected to fractionating conditions for maximum lengths of time.

As a feature of the present invention, there is provided means for varying the quantity of reflux collecting in each of the pools 14. This means may take the form of a valve plate 15 provided with apertures 16, and being manipulated by means of the hand screw 17. For instance, this connection may be brought about as follows: The inner end of the hand screw 17 may be provided with groove 18 adjacent its end, adapted to register with a pin designated diagrammatically at 19. In operation, the apertures 16 in the plate may be brought into registration with certain of the apertures in plate 5, or the registration between the two sets of apertures may be restricted or entirely shut off. By a movement of the valve plate 15, a number of the jet eductors may be cut out to take care of a reduced capacity of liquid in the tower.

As a further feature of the present invention, it may be desirable to increase the volume of reflux falling to any given deck in order to more nearly approach the equilibrium between vapors and liquid. To accomplish this, I provide a return pipe 20 in which is interposed a pump 21, which pipe 20 communicates between a lower separating chamber 12 and one of those thereabove.

In order to provide the necessary reflux for the tower and maintain the desired vapor temperature at the top of the tower a cooling liquid may be introduced through the line 22, in which may be interposed a valve 23 which may, if desired, be automatically controlled to maintain a constant temperature of the fractionated vapors leaving the pipe 24, in which may be interposed a valve 25. It is to be understood that by regulating the temperature and amount of cooling liquid introduced through the line 22 relative to the temperature of the incoming vapors, it is possible substantially to control the temperature of vapors discharging through the line 24.

It will be apparent that the present invention has been designed to operate upon the basic principles involved in fractionation which are that the condensation of vapors from one stage to another, with the consequent reduction in temperature of the liquid in each stage due to latent heat of the vapors being used in vaporization of a lighter product containing less heavy ends, is accomplished by providing the separate jet chambers and separating chambers. The vapors passing through the jet eductors are entrained and permitted to have very intimate contact with the reflux liquid descending in the tower. In the separating chamber below, release of vapors is obtained due to the agitation and to the amount of non-liquid space in each of the separating chambers.

The unvaporized cooling liquid, including reflux condensate, may be withdrawn through the liquid draw-off line 26, in which may be interposed a valve 27. It is obvious that the vapor risers 13 may be positioned exteriorly of the shell 11, as shown, or may be positioned in the interior of the shell, it being necessary only that the vapors ascending through the risers be kept out of contact with the reflux in the separating chamber.

It is understood, of course, that the tower may be provided with insulation or lagging if desired.

I claim as my invention:

1. A process of vapor dephlegmation, which comprises introducing vapors into a confined zone in a dephlegmating column, jetting cooling liquid downwardly through said zone in a multiplicity of streams with sufficient force that the vapors are entrained therein and passed therewith to a separating zone wherein vapor and liquid separate, withdrawing the vapors from said separating zone and passing same out of contact with the liquid descending through the first mentioned zone and discharging said vapors into a second confined zone above the first mentioned zone where entrainment and subsequent separation again takes place, repeating these operations throughout the height of the dephlegmating column, withdrawing from an upper portion of same those vapors which escape condensation, and withdrawing from a lower portion of same the liquid.

2. A process of vapor dephlegmation, which comprises introducing vapors into a confined zone in a dephlegmating column, jetting cooling liquid downwardly through said zone in a multiplicity of streams with sufficient force that the vapors are entrained therein and passed therewith to a separating zone wherein vapor and liquid separate, withdrawing the vapors from said separating zone and passing same out of contact with the liquid descending through the first mentioned zone and discharging said vapors into a second confined zone above the first mentioned zone where entrainment and subsequent separation again takes place, repeating these operations throughout the height of the dephlegmating column, withdrawing from an upper portion of same vapors which escape condensation, and withdrawing from a lower portion of same the liquid, maintaining in each separating zone a pool of cooling liquid and withdrawing liquid from said zone to be used to entrain said vapors from the bottom of the pool.

3. A process of vapor dephlegmation which comprises introducing vapors to a closed zone in a dephlegmating column, jetting cooling liquid downwardly through said zone in a multiplicity of streams with sufficient force that said vapors become entrained in the liquid and descend to a separating zone, removing vapors from said separating zone passing same upwardly to a second closed zone in said dephlegmating column above the first mentioned closed zone where a similar entrainment and subsequent separation takes place, repeating this operation during the travel of the vapors and cooling liquid through the dephlegmating column, finally removing the vapors which escape condensation, and separately removing the liquid.

4. A dephlegmator comprising a shell having vapor inlet and outlet and liquid inlet and outlet, superimposed spaced decks disposed throughout the height of said shell, said spaced decks forming alternately disposed closed jet zones, and separating chambers wherein pools of liquid collect, means for conducting liquid from each pool to the separating chamber therebelow, including jet ejectors for simultaneously breaking up the liquid into a multiplicity of streams, and vapor connections between each separating zone and the second jet zone thereabove.

5. A dephlegmator comprising a shell having vapor inlet and outlet and liquid inlet and outlet, superimposed spaced decks disposed throughout the height of said shell, said spaced decks forming alternately disposed closed jet zones, and separating chambers wherein pools of liquid collect, means for conducting liquid from each pool to the separating chamber therebelow, including means for simultaneously breaking up the liquid into a multiplicity of streams, vapor connections between each separating zone and the second jet zone thereabove, and regulatory means having co-operative engagement with the decks on which the pools of liquid collect adapted to be manipulated to vary the amount of liquid allowed to be withdrawn from the pool.

In testimony whereof I affix my signature.

DONALD J. BERGMAN.